United States Patent Office 2,731,058
Patented Jan. 17, 1956

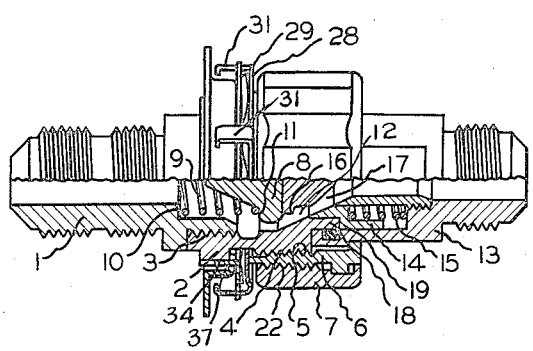

2,731,058

LOCKING PAWL

John Smisko, Jackson, Mich., assignor to Aeroquip Corporation, Jackson, Mich., a corporation of Michigan Application February 17, 1950, Serial No. 144,729

1 Claim. (Cl. 151—39)

This invention relates to mechanical connecting means in which a part to be axially coupled or connected to another part is adapted to be axially advanced with respect to the other part, for attaching thereto, and in which said parts incorporate means adapted for mutual cooperation to hold the connected parts against unintentional or accidental separation due, for example, to vibration or shock.

In particular the invention relates to couplings, such as are employed in association with fluid hose sections to couple the sections in common line flow formation and which involve a pair of tubular coupling sections, one of which coupling sections carries a coupling union member and the other of which coupling sections carries a locking device adapted to cooperate with said coupling union member to hold the same against unintentional or accidental disconnection, due to vibration or shock, for example, when the coupling union member has been tightened into position.

An object of the invention is to provide a locking device which is simple and inexpensive to manufacture yet can be relied upon to prevent accidental or unintentional loosening of a coupling nut or like union sleeve or part.

A particular object of the invention is to provide a locking device which is of simple and inexpensive construction and which can be readily installed upon a fluid coupling to hold the coupling nut against accidental or unintentional loosening due to vibration or like causes.

Further objects and advantages of the invention will appear clear from consideration of the following description of one practical form and application of the invention, given by way of example, with reference to the accompanying drawings in which:

Fig. I is a half-longitudinal section and half-elevational view of a two-part fluid coupling employing a union coupling nut structure and equipped with a locking device in accordance with the invention, Fig. II is a right-hand end view of the male coupling part of Fig. I separated from the female coupling part and from the coupling nut carried thereon, Fig. III is a half-longitudinal section and half-elevational view of a coupling nut capable of being employed in practicing the invention, Fig. IV is a plan view of the ring member of the locking device having the annular assembly of locking teeth, Fig. V is a plan view of the backing ring of the locking device, and Fig. VI is a vertical section of the locking device, on an enlarged scale, with the two ring members and the interposed spring element in assembled relationship.

Referring to the drawings, 1 is a hollow male body part having a male coupling portion 2 secured thereto by a screw-threaded joint 3 and provided with an exteriorly screw-threaded portion 4 for receiving the correspondingly interior screw-threaded portion 5 (Fig. III) of a coupling nut, which latter has an interior portion 6 and an exterior concentric portion 7, the purpose of which will be described later.

The male body parts 1 and 2 contain a valve 8, supported at one end of a coil spring 9, which spring bears against one end of an annular shoulder 10 in the body part 1 as well as against an annular shoulder 11 on the valve 8. The valve 8 engages with an annular valve seat 12 when the coupling parts are separated and thereby serves to seal the end of the male coupling part, as constituted by the hollow body parts 1 and 2.

The other and female body part of the coupling comprises a hollow body portion 13 which is adapted to be coupled to the male body portion 2 and carries the coupling nuts 6 and 7, the interior portion 6 of which has the internal multiple threaded portion 5 by which the nut, as a whole, is threaded upon the exterior screw-threaded part 4 of the male coupling part 2 when it is desired to effect a coupling of the male and female coupling parts together as shown in Fig. I. Arranged within the female body part 13 is a valve sleeve 14, normally urged outward under the action of the coil spring 15 into engagement with its valve seat 16, but shown in Fig. I in the retracted position, brought about by the screwing-up of the coupling nut to effect the coupling of the coupling body parts together and in which retracted position of the valve sleeve 14, the ports 17 in the valve seat are opened to the passage of fluid through the coupled body parts.

In the uncoupled condition of the coupling body parts these ports 17 are closed by the valve sleeve being then urged by its spring 15 into engagement with the valve seat 16. Likewise, in this separated condition of the coupling parts, fluid flow through the male coupling part is prevented by its valve 8 bearing against its seat 12 on the interior of the body part 2.

The male and female coupling parts are connected together by moving the same into engagement with each other so that the flat end face of the valve 8 bears against the flat end face of the valve seat 16 and so that the screwed-interior 5 of the coupling nut engages the screw-threading 5, whereupon, as the nut is screwed up the valve 8 is forced off its seat 12 against the action of its spring 9 and thus opens up the male coupling part to the flow of fluids therethrough. At the same time, the annular boss 18 on the male body part 2 engages with the shoulder 19 of the valve sleeve 14 to urge the same against the action of its coil spring 15, away from its seat 16 and thereby opens up the ports 17 so that there is a clear fluid-flow passage through the entire coupling.

This occurs when the coupling nut is screwed in the direction to effect coupling. At the termination of its said coupling rotation, the nut is automatically held against any unintentional or accidental retrograde or reverse rotation by the engagement of pawl teeth 20 in ratchet teeth 21 provided around the edge of one end of the inner coupling nut portion 6. These ratchet teeth and pawl teeth are so arranged as to afford a kind of free-wheel action during the rotation of the coupling nut as a whole in the direction to effect coupling but provide a lock against rotation of the nut in the reverse direction due to the engagement of the extremities of the pawl teeth between those ratchet teeth against which they happen to be opposite when the coupling nut is screwed home upon the coupling part 2.

It will be seen, therefore, that these ratchet teeth and pawl teeth give an automatic locking of the coupling nut against undesired uncoupling movement, such as might occur due to excessive vibration, for instance.

At the same time it is an advantage to provide that this automatically locked condition of the coupling nut should be capable of being broken, also automatically, when the coupling nut is subjected deliberately to a turning force for rotating the nut in the reverse direction to effect uncoupling.

It is for this purpose that the coupling nut is formed by the two concentric parts 6 and 7, which are connected with each other by quick-action screw-threading 22, which is opposite hand to the screw-threading 5, and the end of which outer nut portion 7 is formed with an inwardly directed radial flange or bead 23 located to partake of limited axial travel, relatively to the inner nut portion 6, within an annular recess 24 in the corresponding end of the latter remote from the end thereof having the axially extending ratchet teeth.

The construction and arrangement is such that when the nut as a whole is rotated in the direction (clockwise as shown) to effect coupling the outer nut part 7 first rotates relatively to the inner nut part 6 until the internal shoulder 25 on the outer nut part abuts against an outwardly directed radial flange 26 on the inner nut part. This relative movement takes the free end edge 27 of the outer nut part clear of the ratchet teeth 21 to the position as shown in Figs. 1 and 3 and when such position is obtained the two nut portions then rotate as one to effect the desired coupling operation.

When, however, the coupling nut is deliberately rotated in the reverse direction to effect uncoupling (such direction being anti-clockwise) and at the very commencement of such rotation, the outer portion 7 of the coupling nut will again travel axially relatively to the inner nut portion 6 but in the reverse direction (i. e. to the left as shown in Fig. I) until the flange 23 is brought up against the flange 25, when the two coupling parts will then rotate as one, but at this time the pawl teeth 20 will have been pushed out of engagement with the ratchet teeth 21, due to their having been engaged by the said free end edge 27 of the outer nut portion and their being so pushed as the outer nut portion is moved axially to the left and relatively to the inner nut part as just described.

The entire operation of both locking the coupling nut against unintentional or accidental retrograde rotation and of freeing the lock when required is thus performed automatically, which is highly advantageous and makes for ease of operation consistent with efficiency.

Referring now to Figs. IV, V and VI, in particular, there is shown therein the form and construction of locking device which forms the subject of the present invention. This locking device is composed of a pair of co-axial ring members 28 and 29, of which the ring 28 has the pawl teeth 20 whereas the ring 29 serves as a backing ring and is normally maintained in axially spaced relationship to the ring 28 by the action of an interposed spring ring 30 of wave-like form.

Both rings are capable of being formed as simple stampings with integral parts thereof simultaneously formed in the same operation. These parts are constituted, as to ring 28, by the pawl teeth 20, which are in the form of an annular assembly and correspond in over-all area and location to the annular series of ratchet teeth 21, and by the rearwardly bent fingers 31, which extend axially from the outer periphery of the ring at circumferentially spaced intervals and latch behind the backing ring 29. These fingers are guided past peripheral notches 32 in the backing ring and have bent-over ends 33 by which axial separation of the ring is limited under the action of the wave-like ring spring 30. As to the backing ring 29, the parts above mentioned, comprise rearwardly directed axial fingers 34 which engage over the squared nut portion 37 and serve properly to locate the locking device as a whole upon the coupling.

The pawl teeth are formed by severing the ring along the lines 38, 39 and 40 and bending out the thus defined pawl teeth from the surface of the ring. The pawl teeth are closely spaced and approximate in number the number of the ratchet teeth 21, whereby the important result is obtained that a number of the pawl teeth are always in locking engagement with the ratchet teeth at the same time.

Having thus described the invention in one particular form and application but without limiting the same to the precise details thus involved, what I claim as novel and wish to secure by Letters Patent is as follows:

A locking pawl device comprising a backing ring and a metallic facing ring operatively connected together, means on the inner periphery of said backing ring for mounting said device on a member in non-rotatable relation thereto, a plurality of circumferentially spaced fingers extending from the outer periphery of one of said rings through notches in the other of said rings with their ends bent to slidably connect said rings together for limited axial relative movement, a plurality of pawl teeth stamped out of the inner peripheral portion of said facing ring, each of said pawl teeth comprising a substantially flat rectangular body portion, connected to said facing ring along one radially extending edge only and extending at an acute angle from said facing ring on the side opposite to said backing ring, and a spring between said rings urging them apart.

References Cited in the file of this patent

UNITED STATES PATENTS

| | | |
|---|---|---|
| 292,063 | Shailer | Jan. 15, 1884 |
| 948,437 | Wilson et al. | Feb. 8, 1910 |
| 968,171 | Lodge | Aug. 23, 1910 |
| 1,394,740 | Klocke | Oct. 25, 1921 |
| 2,283,630 | Hill | May 19, 1942 |
| 2,436,206 | Deming | Feb. 17, 1948 |
| 2,489,919 | Merriman | Nov. 29, 1949 |